United States Patent [19]

Nishimura

[11] 4,435,046
[45] Mar. 6, 1984

[54] LIQUID CRYSTAL DISPLAY DEVICE

[75] Inventor: Katsuo Nishimura, Tokorozawa, Japan

[73] Assignee: Citizen Watch Company Limited, Tokyo, Japan

[21] Appl. No.: 251,452

[22] Filed: Apr. 6, 1981

[30] Foreign Application Priority Data

Apr. 8, 1980 [JP] Japan .................... 55-45240
Oct. 28, 1980 [JP] Japan .................... 55-151224

[51] Int. Cl.³ ............................................. G02F 1/13
[52] U.S. Cl. ................................ 350/334; 350/336; 350/343; 368/242
[58] Field of Search ............. 350/331 R, 334, 336, 350/339 R, 343; 368/64, 88, 242

[56] References Cited

U.S. PATENT DOCUMENTS

| | | | |
|---|---|---|---|
| 3,969,887 | 7/1976 | Fukumoto | 368/242 |
| 3,987,617 | 10/1976 | Slob | 350/336 |
| 4,198,810 | 4/1980 | Fahrenschon | 350/336 |
| 4,212,159 | 7/1980 | Noble et al. | 350/336 |
| 4,227,777 | 10/1980 | Murakami | 350/334 |
| 4,236,240 | 11/1980 | Yoshida | 350/331 R |
| 4,299,462 | 11/1981 | Suzuki et al. | 350/336 |

*Primary Examiner*—Bruce Y. Arnold
*Assistant Examiner*—Richard F. Gallivan
*Attorney, Agent, or Firm*—Jordan and Hamburg

[57] ABSTRACT

A liquid crystal display cell of annular form is provided with a central aperture to accommodate an analog time display section having time indicating hands. The annular liquid crystal cell is characterized in that a plurality of common electrodes are provided on one substrate of the cell, to enable multiplexed drive of the display elements of the cell. Each of the plurality of common electrode comprises a plurality of separate common electrode portions which are electrically connected by connecting lead portions. Half of the connecting lead portions can be arranged to be outside the display area of the cell, thereby enabling the available display area to be maximized.

10 Claims, 15 Drawing Figures

LIQUID CRYSTAL DISPLAY DEVICE

BACKGROUND OF THE INVENTION

The present application relates to a liquid crystal display cell for an electronic timepiece equipped with time indicating hands, the liquid crystal display cell being generally in the form of a frame, of circular or rectangular shape, surrounding a central aperture, in which are accommodated the time indicating hands. In the present specification and claims, such a configuration of liquid crystal display cell will be referred to as of "annular" form, for brevity of description. The annular liquid crystal display cell serves to provide such information as seconds data, in the form of display segments which are successively actuated around the periphery of the analog time display section comprising the time indicating hands. Such a liquid crystal display cell, which enables an electronic timepiece of superior design to be produced in which the time indicating hands display and the liquid crystal display cell are arranged in an attractive and harmonious manner, has previously been disclosed by the present applicant. The present application relates to an improved construction for such a liquid crystal display cell, in which the number of connecting leads between the liquid crystal display cell and associated drive circuits can be reduced, by providing a plurality of common electrodes for the display cell elements. As will be illustrated by the preferred embodiments, the available display area of a liquid crystal display cell according to the present invention is not significantly reduced by comparison with a liquid crystal display cell of similar configuration in which only a single common electrode is provided. With a liquid crystal display cell according to the present invention, the electrodes whereby external circuits are connected to the segment electrodes of the cell can be arranged in an optimum configuration with respect to minimizing the overall size of an electronic timepiece which is provided with a number of externally actuatable switches.

SUMMARY OF THE INVENTION

The present invention relates in general to an improved liquid crystal display cell, and in particular to an improved liquid crystal display cell which is of annular configuration, having a central aperture to accomodate the time indicating hands of an analog time display section, and which is provided with a plurality of common electrodes to enable multiplexed driving of the display elements of the liquid crystal display cell, for thereby reducing the number of interconnections necessary between the liquid crystal display cell and external drive circuits. Each of the common electrodes is formed of a set of common electrode portions, which are separated from one another by at least one portion of another common electrode. The various portions of each common electrode are interconnected by means of connecting leads formed integrally therewith. In the preferred embodiment, two common electrodes are used, with the connecting leads for the set of portions of one common electrode being arranged below an outer layer of sealing material of the liquid crystal display cell and with the connecting leads of the set of portions of the other common electrode being arranged beneath the inner layer of sealing material of the cell. In this way, the connecting leads do not reduce the available display area of the cell, by comparison with a liquid crystal display cell of annular form having a single common electrode. The present invention also discloses an arrangement for the interconnecting electrodes which connect the display segments of the liquid crystal display cell to external drive circuits, whereby the overall size and shape of an electronic timepiece incorporating such an annular liquid crystal display cell and also provided with a plurality of external switches can be optimized, if the switches are generally arranged in lines at right angles to lines in which the display segment interconnecting electrodes are arranged. The present invention also discloses how the display elements of such an annular liquid crystal display cell can be divided into easily identifiable groups, whereby the time information conveyed by successive actuation of these display elements can be more readily comprehended, e.g. in terms of successive units of five seconds.

DESCRIPTION OF THE PREFERRED EMBODIMENTS

Figure 1:
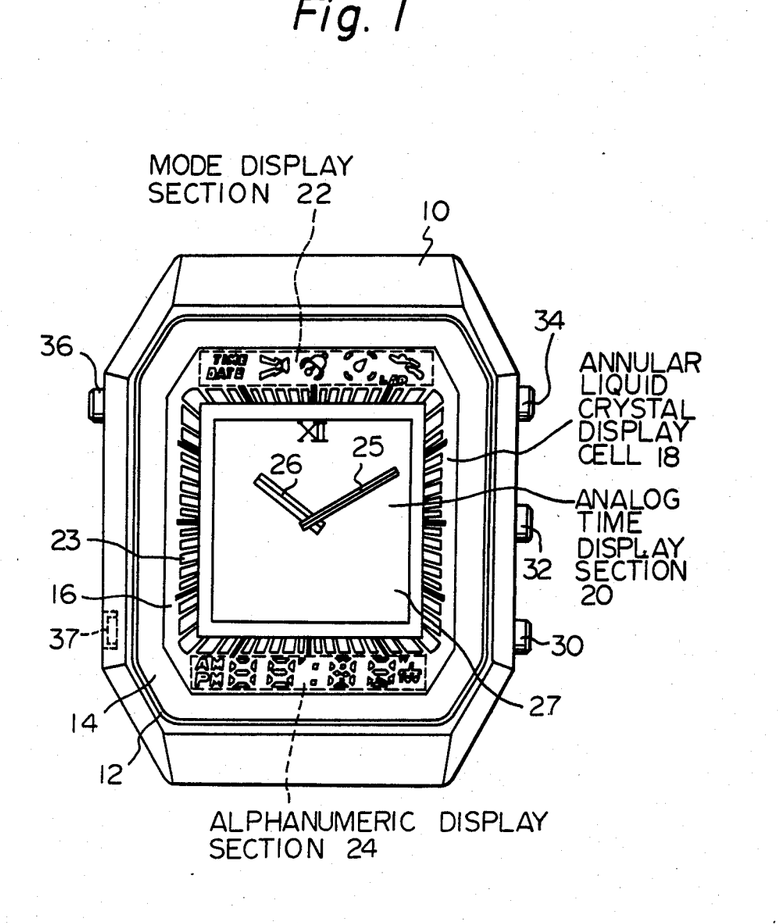
FIG. 1 is a plan view of the face of a dual-display multi-function electronic wristwatch incorporating an embodiment of a liquid crystal display cell according to the present invention.

Referring first to FIG. 1, a plan view is shown therein of an example of a dual-display multifunction electronic wristwatch which incorporates an annular liquid crystal display cell according to the present invention. Numeral 14 denotes the watch glass, which is fixed in the case 10 by means of packing ring 12. Time and other information is displayed by means of an annular liquid crystal display cell 18 according to the present invention having a central aperture within which is provided an analog display section 20, comprising time indicating hands 25 and 26 and a dial 27. The liquid crystal display comprises a mode display section 22, an annular display section 23, and an alphanumeric display section 24.

A set of four externally operable switches are provided, as denoted by numerals 30, 32, 34, 36 and 37, for controlling various timepiece functions such as time correction, mode selection, etc.

Figure 2:
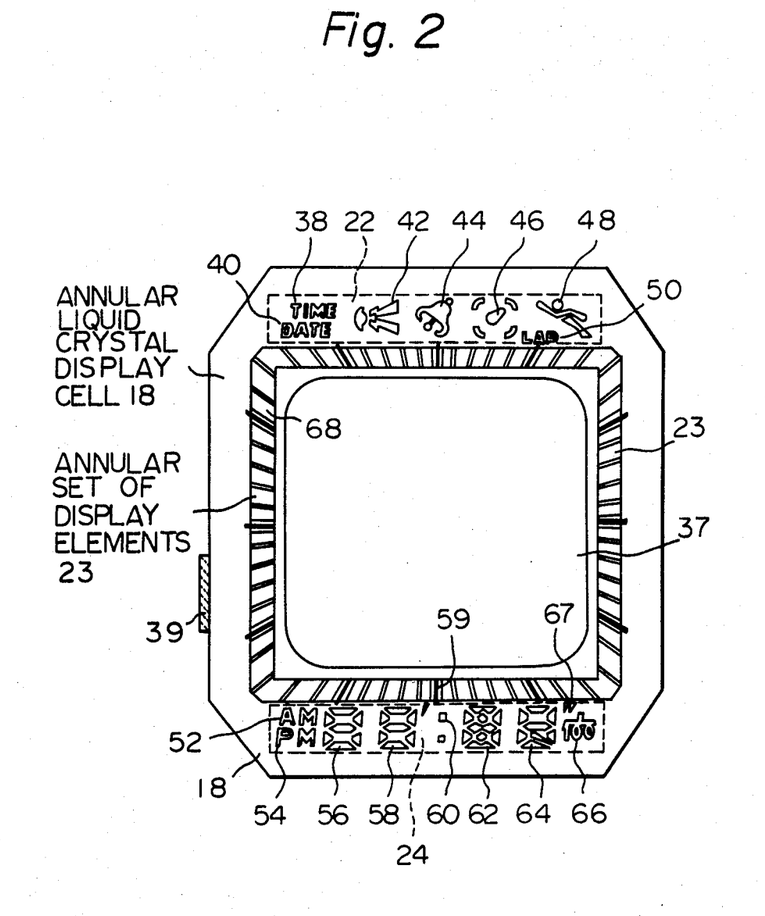
FIG. 2 is a plan view of an embodiment of an annular liquid crystal display cell according to the present invention.

Referring now to FIG. 2, a plan view of an embodiment of an annular liquid crystal display cell according to the present invention is shown, which can provide the display functions described above with respect to FIG. 1. Mode display section 22 comprises a time mode pattern 38, a date mode pattern 40, an alarm mode pattern 42, a chime mode pattern 44, a timer mode pattern 44, stopwatch mode pattern 48, and an indication "LAP" which designates whether the indicated time is lap time or elapsed time. Annular display section 23 comprises a set of 60 separate display elements, of approximately rectangular shape, such as that denoted by numeral 68, and can display for example second information, by successive elements being activated at one-second intervals.

Alphanumeric display section 24 comprises service markers 52 and 54 for indicating AM or PM respectively, two 8-segment bar-type element arrays 56 and 58 for alphanumeric display, a colon marker 60, and alphanumeric display segment arrays 62 and 64, as well as a 1/100 second marker 66. Calendar information, i.e. the date and day of the week, is displayed by alphanumeric characters of alphanumeric display section 24, while current time, stopwatch and alarm times, are displayed by numeric characters of alphanumeric display section 24.

A central aperture 37 which is approximately square in shape is provided in liquid crystal display cell 18, to accommodate analog display section 20. Numeral 39 denotes a solder seal which is provided to seal off liquid crystal material inside the liquid crystal display cell at the time of manufacture.

Figure 3:
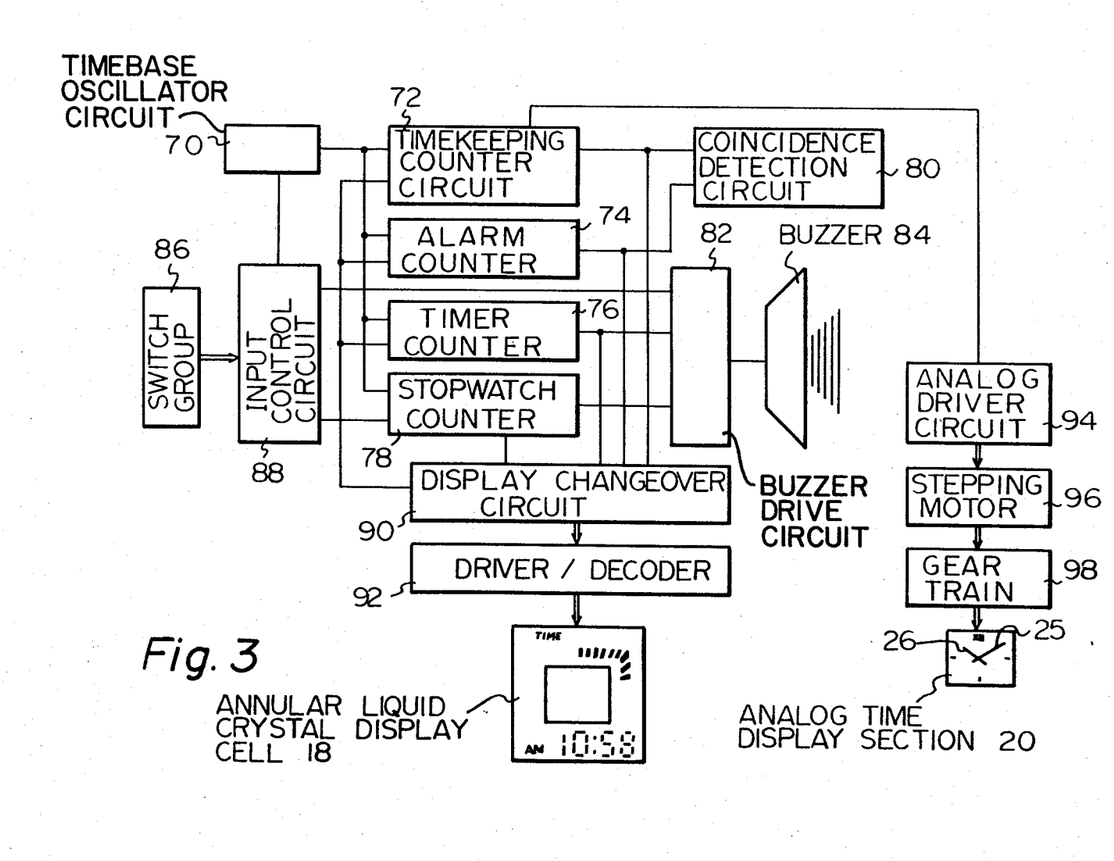
FIG. 3 is a block diagram of a dual-display multifunction wristwatch such as that of FIG. 1.

Referring now to FIG. 3, a block diagram is shown therein illustrating the general configuration of a dual-display multi-function electronic timepiece such as that of FIG. 1, incorporating an annular liquid crystal display cell according to the present invention. Numeral 70 denotes a combination of a standard frequency oscillator circuit, which produces an output signal of approximately 32 kHz, and a frequency divider which receives the standard frequency signal to provide a one-second period signal. This is supplied to a timekeeping counter circuit 72, which counts seconds, minutes, hours, AM/PM, day, date, month and year, and produces output signals indicative of these. Numeral 74 denotes an alarm counter circuit, which counts the hours and minutes when an alarm time is set therein. Timer counter circuit 74 serves to count down the hours, minutes and seconds of elapsed time, from a preset time of 12 hours or less. Stopwatch counter circuit 78 serves to cumulatively count minutes, seconds and hundredths of a second, up to a maximum of 60 minutes. Coincidence detection circuit 80 serves to detect coincidence between the contents of timekeeping counter circuit 72 and the contents of alarm counter circuit 74, and to produce an output signal when such coincidence is detected. This output signal activates a buzzer drive circuit 82, to drive a buzzer 84, whereby an audible signal is emitted.

Numeral 86 denotes the set of switches 30, 32, 34 and 36 which are shown in FIG. 1. Signals from these switches are applied through an input control circuit 88. Output signals which are thereby produced from input control circuit 88 serve to set an alarm time, select the operative or inoperative state of the alarm function, select various operating modes, terminate an audible alarm signal, etc. Display changeover circuit 90 serves to select the information to be displayed, in accordance with switch signals applied to input control circuit 88.

The output signals from display changeover circuit 90 are applied to a display drive/decoder circuit 92, signals from which drive the annular liquid crystal display cell 18 to display alphabetic or numeric characters, as well as the annular array of display elements 23.

Signals from the timekeeping counter circuit 72 are applied to analog driver circuit 94, which thereby produces periodic drive pulses to advance a stepping motor 96. Stepping motor 96 drives the time indicating hands 24 and 26 through a gear train 98.

Figure 4:
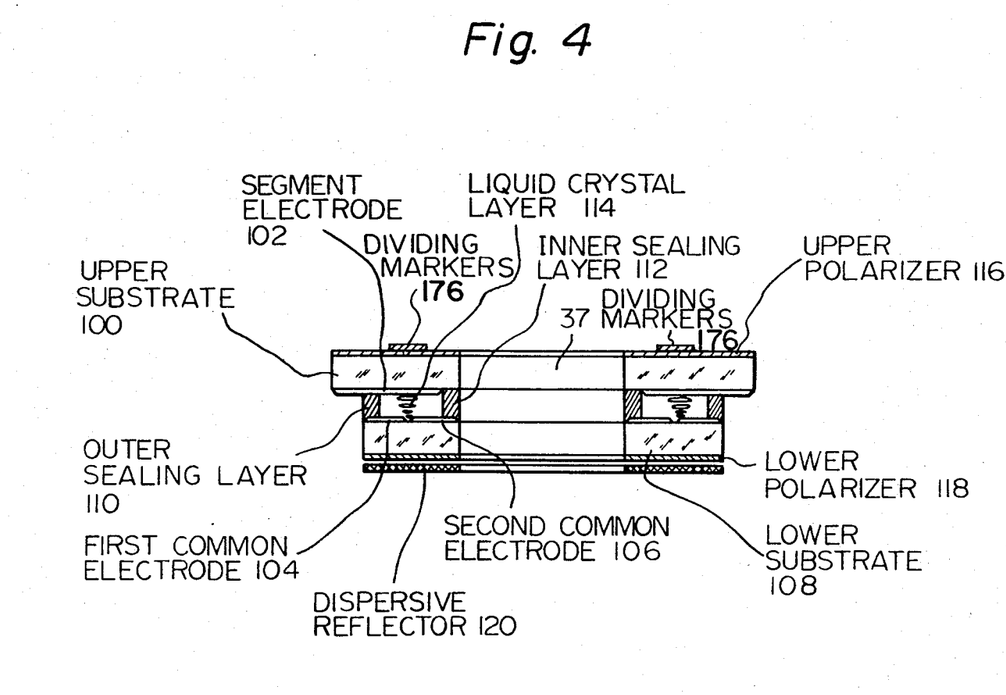
FIG. 4 is cross-sectional view in elevation of an embodiment of an annular liquid crystal display cell according to the present invention.

Referring now to FIG. 4, a cross-sectional view is given therein of an annular liquid crystal display cell according to the present invention. Numerals 100 and 108 denote an upper transparent substrate and a lower transparent substrate respectively, each of these being of annular shape to provide a central aperture 37. An outer sealing layer 110 and an inner sealing layer 111 provided adjacent to the outer and inner peripheries of upper and lower transparent substrates 100 and 108 serve to form an enclosed chamber of annular shape between these substrates, within which a layer of liquid crystal material 114 is enclosed. Numeral 102 denotes a portion of a set of segment electrodes which are formed on the inner surface of upper transparent substrate 100, while numerals 104 and 106 denote a first common electrode and a second common electrode respectively, formed upon the inner surface of lower transparent substrate 108. These common electrodes 104 and 106, and segment electrodes 102, can be formed by depositing an electrically conductive thin film having as its principle constituent indium oxide ($In_2O_3$) or tin oxide ($SnO_2$), and by photo-etching this thin film to produce the desired pattern of segment or common electrodes. An alignment layer is formed over segment electrodes 102 and remaining areas of the inner surface of substrate 100, and another alignment layer is formed over first and second common electrodes 104 and 106 and the remaining surface area of low substrate 108, to provide alignment of the molecules of the layer of liquid crystal material 114 in mutually perpendicular directions. These alignment layers can be formed by slant evaporative deposition of SiO or by a rubbing technique. The outer sealing layer 110 and inner sealing layer 112 can be formed of a low melting-point glass or of epoxy resin, for example, and should leave a gap of approximately 8 microns between the upper and lower transparent substrates 100 and 108. The liquid crystal layer 114 is then provided by injection of a P-type nematic liquid crystal material into the enclosed chamber thus formed between the upper and lower substrates. This chamber is then sealed off, e.g. by the solder plug 39 shown in FIG. 2. As a result, the liquid crystal layer 114 is of twisted nematic molecular configuration. Numerals 116 and 118 denote an upper and a lower polarizer respectively, which are bonded to the outer surface of upper substrate 100 and lower substrate 108 respectively. Numeral 120 denotes a dispersive reflector plate, provided below the lower substrate 108. In the absence of an applied voltage between the common electrodes and segment electrodes 102, the twisted nematic liquid crystal layer causes rotation of the plane of polarization of light which passes through the display cell. When a voltage of sufficient magnitude is applied between the segment electrode 102 and the first common electrode 104, the alignment of the molecules of liquid crystal layer 114 is altered, such that rotation of the plane of polarization of light passing through the corresponding part of the liquid crystal display cell does not occur. As a result, as viewed from the top of the display cell, that portion of the display for which a voltage is applied between the segment electrode 102 and the first common electrode 104 will appear dark with respect to the remainder of the display area. Similarly, when a voltage is applied between the segment electrode 102 and the second common electrode 106, the corresponding area of the display cell will appear dark. Thus, by arranging two common electrodes to overlap a single segment electrode, and applying multiplexed drive signals to the common and display electrodes, two independent display elements can be provided by a single segment electrode. The multiplexing drive can be based on the $\frac{1}{2}$ drive voltage method, or on the average voltage method. By comparison with a nonmultiplexing drive method, this arrangement (i.e. with two common electrodes) provides a reduction of approximately 50% in the number of segment electrodes required to produce a given number of display segments. Thus, the number of interconnections required between the liquid crystal display cell and the drive circuitry of the timepiece can be significantly reduced by utilizing an annular liquid crystal display cell according to the present invention.

The most suitable mode of operation of the liquid crystal layer 114 for a liquid crystal display cell to which multiplexed drive signals are applied is the TN-FE mode. This is the preferred mode for a liquid crystal display cell according to the present invention.

Figure 5:
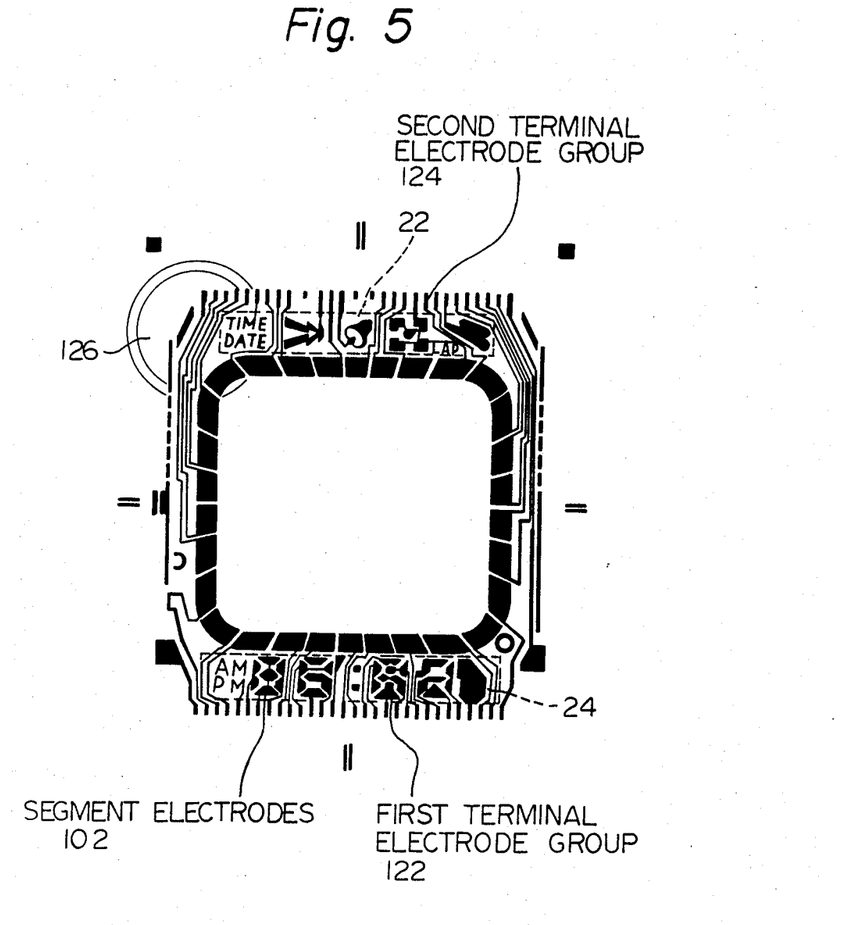
FIG. 5 is a view in plan of a segment electrode pattern of the embodiment of a liquid crystal display cell according to the present invention shown in FIG. 2.

Referring now to FIG. 5, a pattern of segment electrodes 102 is shown in plan view. This comprises segment electrodes for the mode display section 22, the annular display section 23, and the alphanumeric display section 24. Numerals 122 and 124 denote a first group of terminal electrodes and a second group of terminal electrodes respectively. The terminal electrodes in these groups serve to provide electrical connections between the various segment electrodes 102 and external drive circuitry, i.e. the display driver/decoder circuit 92. Connections to these first and second terminal electrode groups is performed by means of strips of electrically conductive rubber, arranged between these terminal electrodes and the circuit substrate of the timepiece. It can be seen in FIG. 5, the first terminal electrode group is arranged in line at the bottom of the segment electrode pattern, while the second terminal electrode group 124 is arranged in line at the top of the segment electrode pattern. Thus if, as shown in FIG. 1, the timepiece incorporating the annular liquid crystal display cell is provided with a number of switches such as are denoted by numerals 30 to 37, and if these switches are provided (as is usually the case) on the right and left sides of the timepiece as viewed in FIG. 1, then it will be apparent that the arrangement of terminal electrode groups 122 and 124 shown in FIG. 5 will enable a maximum amount of space to be provided on each side of the annular liquid crystal display cell, in which such switches may be accommodated. In other words, since no terminal electrode connections are established on either the left or right hand side of the liquid crystal display cell (as viewed in FIG. 5), switches may be positioned immediately adjacent to the right and left sides of the cell. It will therefore be clear that an arrangement of terminal electrodes for an annular liquid crystal display cell according to the present invention as shown in FIG. 5 will enable a timepiece equipped with a plurality of external switches to be made extremely compact.

Figure 6:
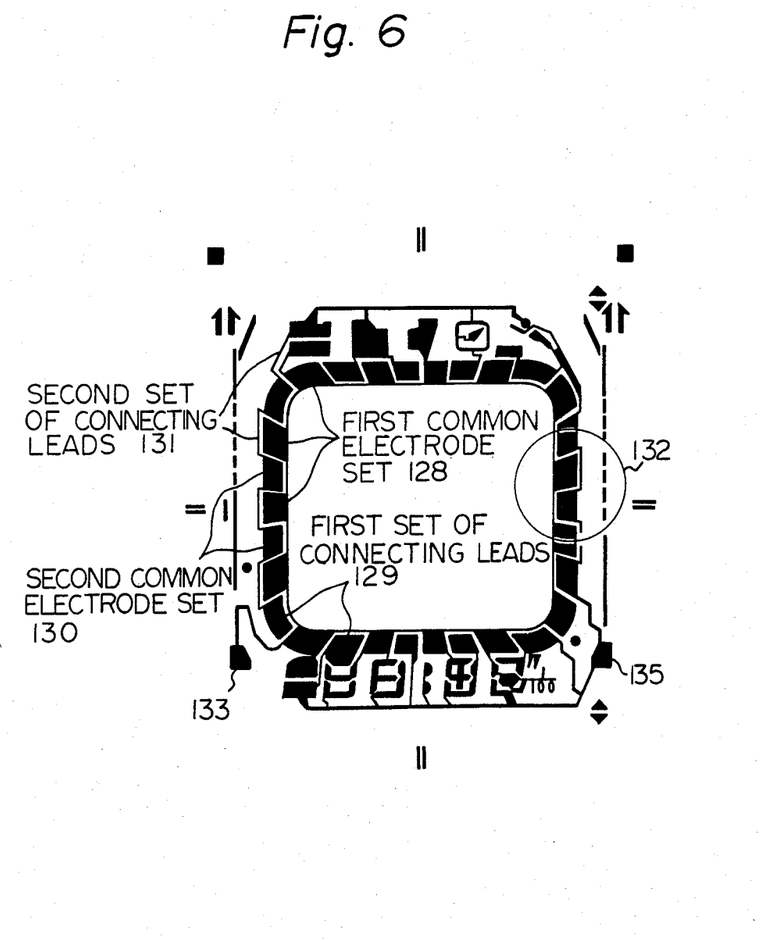
FIG. 6 is a plan view of a common electrode pattern of the embodiment of a liquid crystal display cell according to the present invention shown in FIG. 2.

Referring now to FIG. 6, a plan view is shown therein of first and second common electrodes 104 and 106 formed on the inner surface of lower substrate 108. It is an important feature of the present invention that the first and second common electrodes 104 and 106 are each divided into a plurality of separate portions, designated as first common electrode set 128 and second common electrode set 130 shown in FIG. 6. The common electrode portions of these first and second sets 128 and 130 are arranged in a successively alternating manner, i.e. each pair of common electrode portions of first set 128 is separated by one common electrode portion of second set 130, and vice versa. The members of the first common electrode set 128 are connected by means of a set of connecting leads 129, while the portions of the second common electrode set 130 are connected by means of a set of connecting leads 131. These connecting leads 129 and 131 can be formed integrally from the same thin film layer as the portions of the first and second common electrode sets 128 and 130. As shown, all of the connecting leads 129 of the first common electrode set 128 are arranged around the inner periphery of the annular display segment group 23, while the connecting leads 131 of the second common electrode 130 are arranged substantially around the outer periphery of annular display segment group 23. External connection to the first and second common electrode sets 128 and 130 is provided by means of terminal electrodes 133 and 135.

Figure 7:
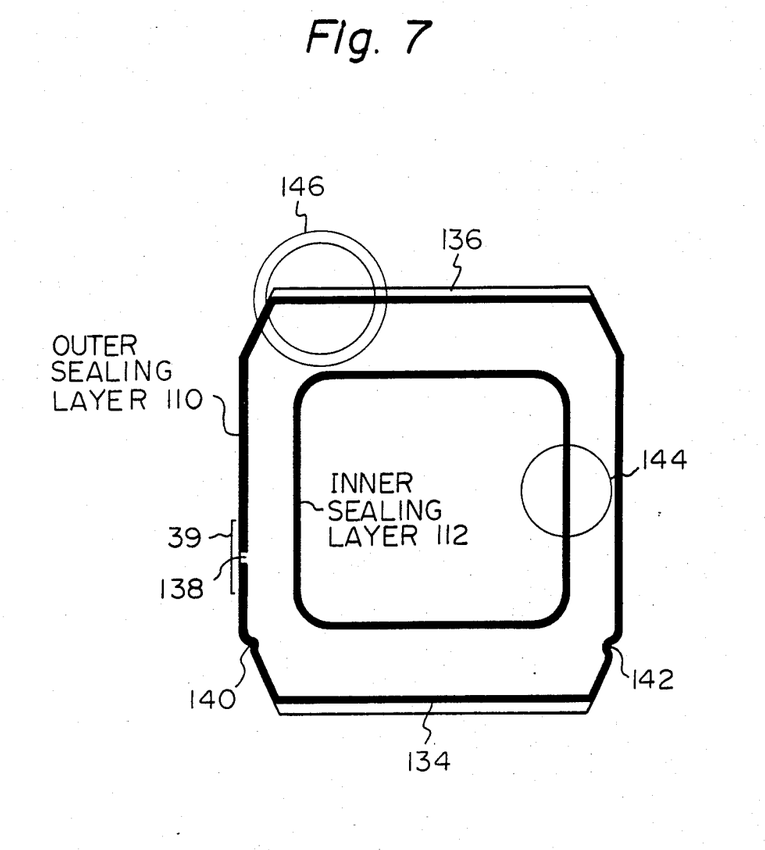
FIG. 7 is a diagram showing inner and outer annular sealing layers for an annular liquid crystal display cell according to the present invention.

FIG. 7 is a diagram illustrating the configuration of the inner and outer sealing layers 110 and 112, as viewed in plan cross-section. Numeral 138 denotes an injection aperture formed in the outer sealing layer 110, through which liquid crystal material is injected. This aperture is then sealed off by means of solder seal 39. Recessed portions 140 and 142 are formed in the outer sealing layer 110, in order to facilitate connection to the terminal electrodes 133 and 135 of the common electrodes, shown in FIG. 6. Areas 134 and 136, which are on upper substrate 100 and which lie outside the outer periphery of outer sealing layer 110, serve to accommodate the first and second terminal electrode groups 122 and 124, respectively.

Figure 8:
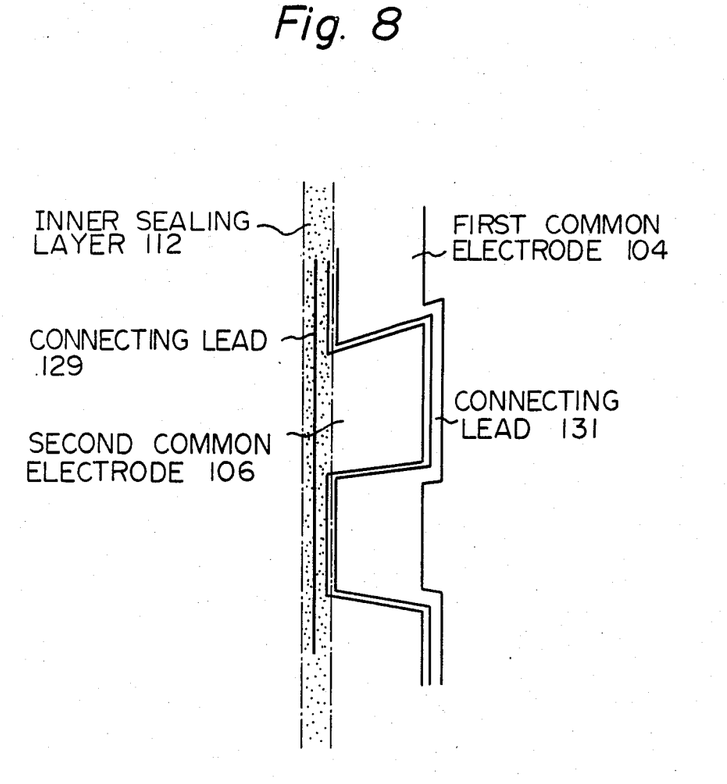
FIG. 8 is a view in plan of a portion of the common electrode pattern of FIG. 6, illustrating the manner in which a sealing layer overlaps connecting leads of portions of a common electrode.

FIG. 8 is a diagram for illustrating the relationship between the positions of the connecting leads 129 of second common electrode 106 and the inner sealing layer 112, and also clearly illustrates the divided common electrode configuration. FIG. 8 is an enlarged view illustrating the area within circle 132 in FIG. 6 and circle 144 in FIG. 7. The portion of the connecting leads 129 is, as stated above, formed between the inner surface of lower substrate 108 and the inner sealing layer 112, which completely covers connecting lead 129. Thus, the area required on the substrate surface to accommodate the connecting leads 129 does not result in a reduction of the overall display area of the liquid crystal display cell, by comparison with an annular liquid crystal display cell which employs only a single common electrode. As a result, the display area available for the annular set of display segments 23 is maximized, and so also is the area available for analog display section 20 with time indicating hands 25 and 26.

Figure 9:
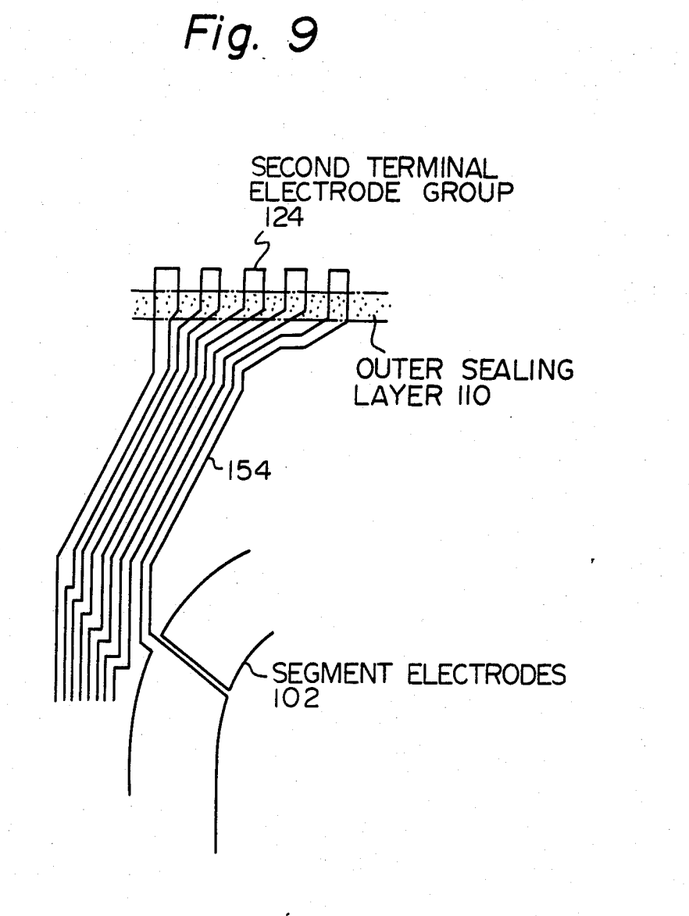
FIG. 9 is a view in plan of a portion of the segment electrode pattern of FIG. 5, illustrating an overlapping of a group of terminal electrodes by an outer sealing layer.

FIG. 9 is an enlarged view of the area within circle 126 shown in FIG. 5, and illustrates the way in which the outer sealing layer 110 overlaps the second terminal electrode group 124. The electrodes of second terminal electrode group 124 are arranged on the upper substrate 100, with a portion of these terminal electrodes being covered by the outer sealing layer 110 as shown in FIG. 9. Connection between the terminal electrodes and the segment electrodes 102 is provided by means of connecting leads 154.

Figure 10:
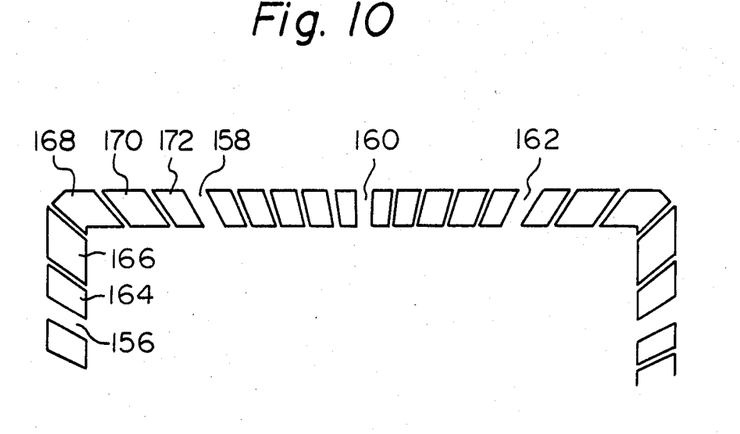
FIG. 10 is a view in plan of an arrangement of an annular array of display elements of a liquid crystal display cell according to the present invention wherein the display elements are formed into groups which are separated by gaps.

Referring now to FIG. 10, an arrangement of display segments of annular display segment group 23 (illustrated in FIG. 2) according to the present invention is shown. As shown, the segments of annular display element group 23 are arranged in blocks of five segments, such as are denoted by numerals 164, 166, 168, 170 and 172, with a relatively narrow gap separating adjacent segments in such a block of five, and with a relatively large gap between adjacent blocks of five, as denoted by numerals 156, 158, 160, 162. Such an arrangement enables the seconds time information or other information displayed by annular display element group 23 to be more rapidly and easily comprehended.

Figure 11:
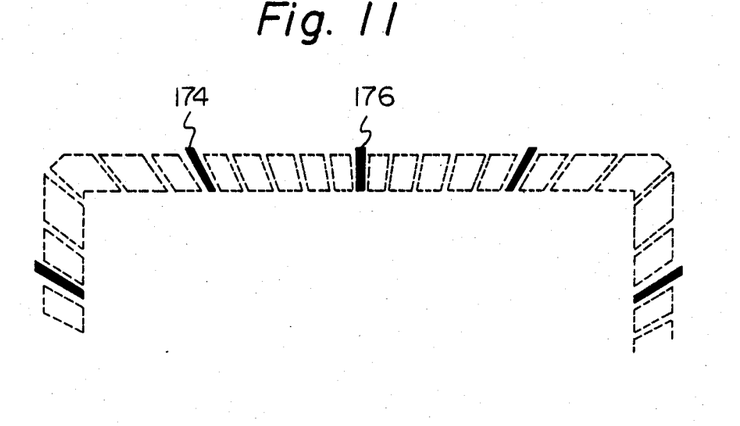
FIG. 11 is a partial view in plan of an arrangement of an annular array of display elements of a liquid crystal display cell according to the present invention wherein the display elements are formed into groups which are separated by fixed markers.

FIG. 11 shows an alternative arrangement to that of FIG. 10, wherein dividing markers, such as that denoted by numerals 174 and 176 are provided in the gaps between adjacent blocks of display segments. These dividing markers, in addition to assisting in reading the information displayed by annular display element group 23, also serve as graduations for reading the time information indicated by the minutes and hours hands 24 and 26 of the analog display section 20. These dividing markers can, for example, be printed on the lower surface of the upper polarizer 116 (shown in FIG. 4) by a screen printing or hectograph technique.

Figure 12:
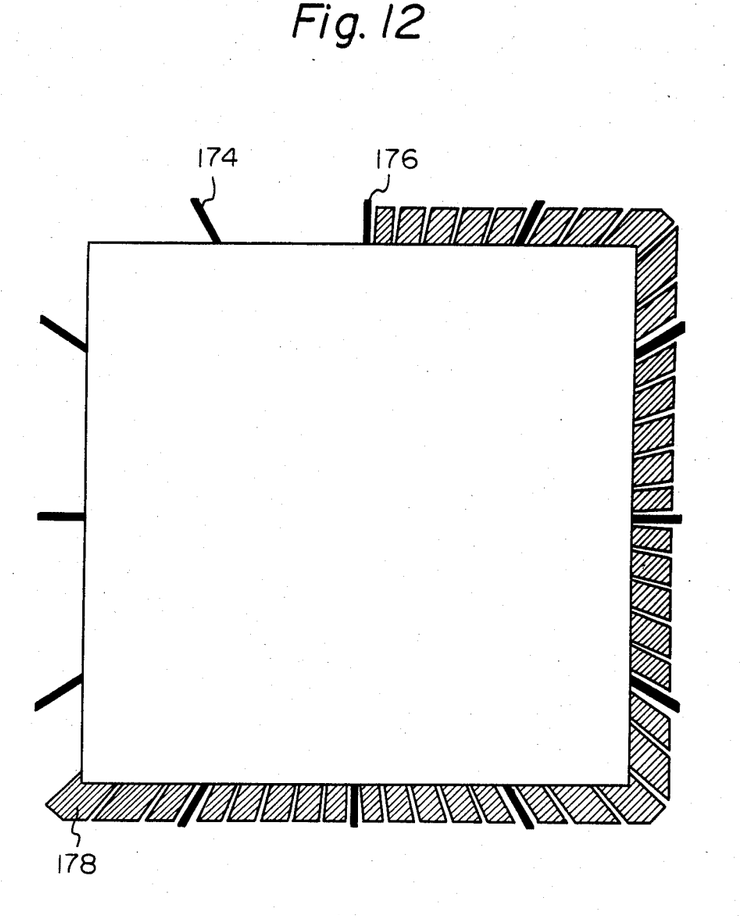
FIG. 12 is a view in plan of an annular array of display elements of a liquid crystal display cell according to the present invention arranged as in FIG. 11, illustrating a plurality of the display elements in the activated condition.

FIG. 12 illustrates the appearance of the annular display element group 23 when some of the display segments in that group are in the activated state, for the case in which dividing markers such as 174 and 176 are provided. For the condition shown in FIG. 12, seven blocks each of five display segments, are in the activated state (i.e. appearing dark with respect to the remainder of the display area) while only three segments of the eighth block are in the activated state. This clearly indicates that 37 seconds have elapsed.

Figure 13:
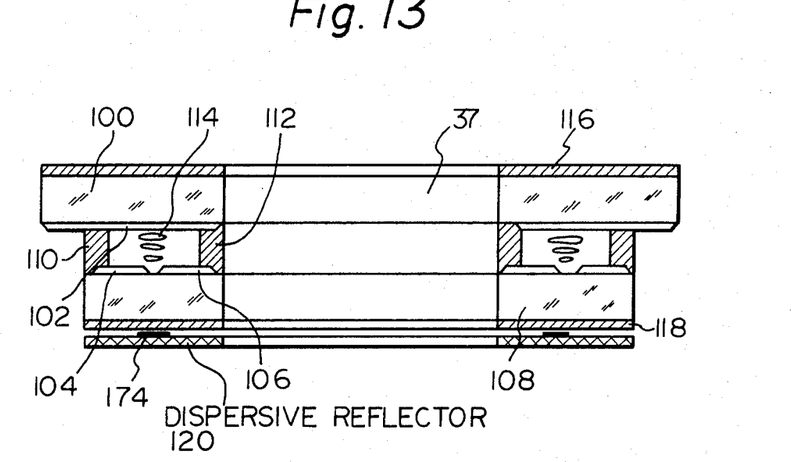
FIG. 13 is a cross-sectional view in elevation of an embodiment of a liquid crystal display cell according to the present invention, such as that of FIG. 11, wherein said fixed markers are formed upon a dispersive reflector of the liquid crystal display cell.

FIG. 13 illustrates an embodiment of an annular liquid crystal display cell according to the present invention in which the dividing markers, such as 174 and 176, are formed by a honing process upon the upper surface of dispersive reflector 120. These dividing markers can be formed by performing relatively coarse honing of the areas concerned, during the honing process whereby the dispersive reflecting surface is formed on dispersive reflector 120. Alternatively, the dividing markers may be formed on dispersive reflector 120 by pressing, to form raised portions.

Figure 14:
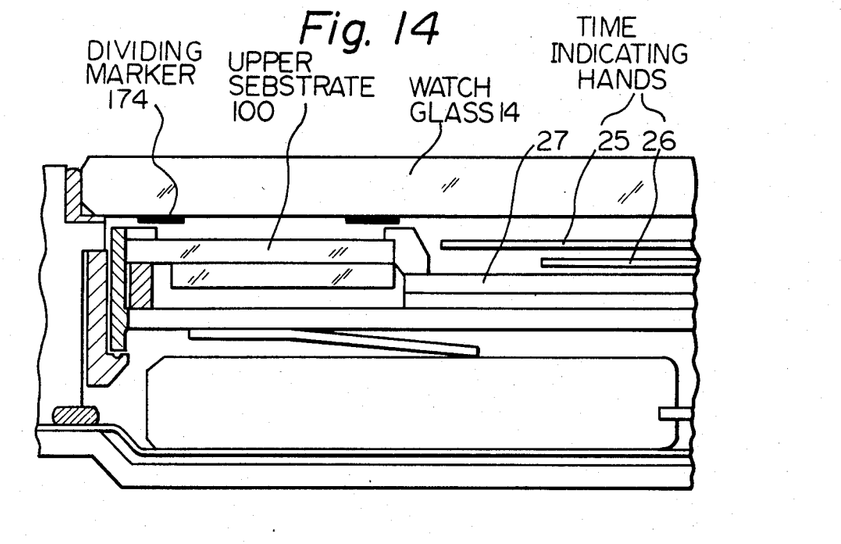
FIG. 14 is a partial view in elevation of an example of an electronic timepiece provided with a liquid crystal display cell according to the present invention, wherein fixed markers such as are shown in the embodiment of FIG. 11 are formed on a lower surface of a watch glass of the timepiece.

FIG. 14 illustrates another method whereby a dividing marker, as denoted by numeral 174, can be formed on the inner surface of a watch glass 14 of the timepiece, the dividing markers being positioned above the upper substrate 100 of the annular liquid crystal display cell.

Figure 15:
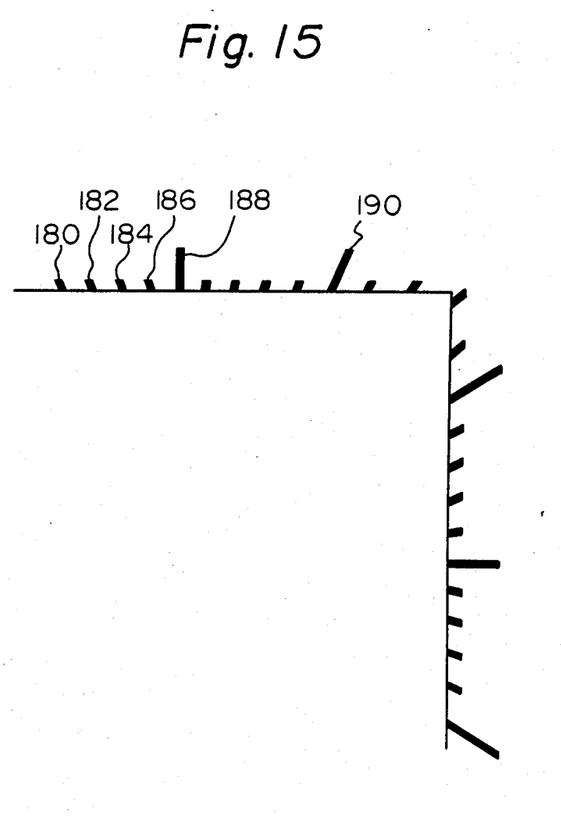
FIG. 15 is a partial view in plan of a modification of the embodiment of FIG. 11, wherein two different sizes of fixed marker are utilized.

It is equally possible to provide other dividing markers, relatively short in length, between the block-dividing markers. This is illustrated in FIG. 15, in which short dividing markers such as denoted by numerals 180, 182, 184 and 186 are formed between longer dividing markers such as denoted by numerals 188 and 190.

It should be noted that, although in the preceding embodiments the display segments of annular display element group 23 are arranged in blocks of five segments, it is equally possible to arrange these segments in blocks of 10 or 15.

In the embodiments of the present invention described hereinabove, an annular liquid crystal display cell has been described which has two common electrodes, each composed of a plurality of separate portions interconnected by connecting leads. However it is also possible to provide three or more of such common electrode sets in an annular liquid crystal display cell according to the present invention. In such a case, it would not be possible to utilize a simple arrangement of the connecting leads between the individual portions of the common electrode sets, such as that illustrated in FIG. 6. However a practical arrangement could be implemented by, for example, providing insulated cross-overs between connecting leads of different common electrode sets, by thin film deposition techniques which are well known in the art. In addition, either full matrix drive or partial matrix drive can be applied to an annular liquid crystal display cell according to the present invention Various methods can be adopted to manufacture an annular liquid crystal display cell according to the present invention. One method is to first machine square apertures into glass plates, by a process such as ultrasonic machining, to thereby produce the upper and lower annular transparent substrates 100 and 108. The electrode and alignment layers can then be formed on the substrates, and sealing of the inner and outer peripheries of the cell performed by means of sealing layers 112 and 110. An alternative manufacturing procedure is to first form the electrode and alignment layers on glass plates, without initially machining apertures in these plates, then to seal the plates by means of sealing layers 110 and 112. The liquid crystal material is then injected, and the injection aperture sealed off. The areas of the liquid crystal display cell other than those where the central aperture 37 is to be formed can then be masked off by suitable masking material, e.g. rubber, and liquid honing performed to machine square apertures into the transparent substrates. The dimensional accuracy of the aperture thus produced can be enhanced by grinding the inner periphery, e.g. with diamond chips.

In the preceding description and in the appended claims, it should be clearly understood that the term "common electrode set" as used with reference to the present invention refers to a plurality of common electrode portions, such as are denoted by reference numeral 128 in FIG. 6, which are electrically connected together by means of a plurality of connecting leads of relatively narrow width, such as are denoted by numeral 129 in FIG. 6.

From the preceding description, it will be apparent that the objectives set forth for the present invention are effectively attained. Since various changes and modifications to the above construction may be made without departing from the spirit and scope of the present invention, it is intended that all matter contained in the above description or shown in the accompanying drawings shall be interpreted in an illustrative and not in a limiting sense. The appended claims are intended to cover all of the generic and specific features of the invention described herein.

What is claimed is:

1. A liquid crystal display device for an electronic timepiece provided with time indicating hands, said liquid crystal display device having an annular configuration and comprising a plurality of display elements arranged in an annular arrangement, with said time indicating hands to be disposed within a central aperture of said liquid crystal display device, said liquid crystal display device comprising:

first and second annular transparent substrates;
an outer layer of sealant material disposed between said first and second transparent substrates adjacent to the outer periphery thereof, and an inner layer of sealant material disposed between said first and second transparent substrates adjacent to the inner periphery thereof to thereby form an annular chamber between said first and second transparent substrates; a layer of liquid crystal material provided within said annular chamber between said first and second transparent substrates;
a plurality of segment electrodes formed on an inner surface of said first transparent substrate; and first and second common electrodes formed on an inner surface of said second transparent substrate, each of said common electrodes comprising a plurality of electrically interconnected common electrode portions, with the common electrode portions of said first and second common electrodes being arranged in a successively alternating manner around said second transparent substrate, said common electrodes being operable in conjunction with a first set of said segment electrodes for defining said plurality of display elements arranged in an annular configuration.

2. A liquid crystal display device according to claim 1, in which a second set of said segment electrodes are operable in conjunction with said common electrodes for defining a plurality of sets of display elements for displaying alphanumeric characters.

3. A liquid crystal display device according to claim 1, in which a third set of said segment electrodes are operable in conjunction with said common electrodes for defining a plurality of symbols indicative of the operating condition of said electronic timepiece.

4. A liquid crystal display device according to claim 1, and further comprising a plurality of terminal electrodes foremd on said first transparent substrate, each of said terminal electrodes being connected to a corresponding one of said segment electrodes, with at least a portion of each of said terminal electrodes extending outward from the outer periphery of said outer layer of sealant material.

5. A lquid crystal display device according to claim 4, in which said first transparent substrate is of generally square outer periphery, and in which said plurality of terminal electrodes comprise a first group and a second group of terminal electrodes with said first terminal electrode group being arranged in line along one side of the outer periphery of said first transparent substrate and said second terminal electrode group being arranged in line along the opposite side of the outer periphery of said first transparent substrate.

6. A liquid crystal display device according to claim 1, in which said plurality of display elements arranged in an annular configuration are delimited into blocks of display elements by means of dividing markers.

7. A liquid crystal display device according to claim 6, in which said liquid crystal display device further comprises a polarizer positioned adjacent to the external surface of one of said first and second transparent substrates, and in which said dividing markers are formed upon said polarizer.

8. A liquid crystal display device according to claim 6, in which said liquid crystal display device further comprises a dispersive reflector positioned adjacent to the external surface of said second transparent substrate and in which said dividing markers are formed upon said dispersive reflector.

9. A liquid crystal display device according to claim 6, in which said timepiece further comprises a watch glass, and in which said dividing markers are formed upon said watch glass.

10. A liquid crystal display device according to claim 1, in which said common electrode portions of said first common electrode are interconnected by connecting leads positioned on said second transparent substrate beneath said inner layer of sealant material.

* * * * *